(12) United States Patent
Phelan et al.

(10) Patent No.: US 9,830,271 B2
(45) Date of Patent: Nov. 28, 2017

(54) TRANSPARENT VIRTUALIZATION OF CLOUD STORAGE

(75) Inventors: Thomas A. Phelan, San Francisco, CA (US); Erik Cota-Robles, Mountain View, CA (US); David William Barry, Kensington, CA (US); Adam Back, Sliema (MT)

(73) Assignee: VMware, Inc., Palo Alto, CA (US)

( * ) Notice: Subject to any disclaimer, the term of this patent is extended or adjusted under 35 U.S.C. 154(b) by 460 days.

(21) Appl. No.: 13/557,650

(22) Filed: Jul. 25, 2012

(65) Prior Publication Data

US 2014/0032850 A1 Jan. 30, 2014

(51) Int. Cl.
*G06F 12/08* (2016.01)
*G06F 12/0873* (2016.01)

(52) U.S. Cl.
CPC .... *G06F 12/0873* (2013.01); *G06F 2212/152* (2013.01); *G06F 2212/263* (2013.01); *G06F 2212/311* (2013.01)

(58) Field of Classification Search
CPC ... H04L 67/125; G06F 3/067; G06F 21/6218; G06F 9/45533; G06F 3/0604; G06F 12/0868
See application file for complete search history.

(56) References Cited

U.S. PATENT DOCUMENTS

| | | | | |
|---|---|---|---|---|
| 5,813,011 A | * | 9/1998 | Yoshida | G06F 3/0608 |
| 8,209,343 B2 | * | 6/2012 | Joshi et al. | 707/758 |
| 2005/0289218 A1 | * | 12/2005 | Rothman et al. | 709/203 |
| 2009/0150629 A1 | * | 6/2009 | Noguchi | G06F 11/1402 711/162 |
| 2009/0198910 A1 | * | 8/2009 | Arimilli | G06F 12/0831 711/141 |
| 2010/0153617 A1 | * | 6/2010 | Miroshnichenko et al. | 711/6 |
| 2010/0274772 A1 | * | 10/2010 | Samuels | 707/693 |
| 2011/0119668 A1 | * | 5/2011 | Calder | G06F 3/0604 718/1 |
| 2013/0024722 A1 | * | 1/2013 | Kotagiri et al. | 714/6.1 |
| 2013/0151802 A1 | * | 6/2013 | Bahadure | G06F 3/0605 711/162 |

OTHER PUBLICATIONS

Unknown, "Amazon Web Services—Amazon Elastic Block Store (EBS)", Retrieved at <<http://aws.amazon.com/ebs>>, Retreved on May 22, 2012, 3 pages.

(Continued)

*Primary Examiner* — Reginald Bragdon
*Assistant Examiner* — Thanh Vo

(57) ABSTRACT

Embodiments present a virtual disk image to applications such as virtual machines (VMs) executing on a computing device. The virtual disk image corresponds to one or more subparts of binary large objects (blobs) of data stored by a cloud service, and is implemented in a log structured format. Grains of the virtual disk image are cached by the computing device. The computing device caches only a subset of the grains and performs write operations without blocking the applications to reduce storage latency perceived by the applications. Some embodiments enable the applications that lack enterprise class storage to benefit from enterprise class cloud storage services.

15 Claims, 6 Drawing Sheets

(56) References Cited

OTHER PUBLICATIONS

Unknown, "Amazon Web Services—Amazon Simple Storage Service (Amazon S3)", Retrieved from <<http://aws.amazon.com/s3>>, Retrieved on May 22, 2012, 5 pages.
Unknown, "Amazon Web Services—Amazon S3 Pricing", Retrieved from <<http://aws.amazon.com/s3/pricing/>>, Retrieved on May 22, 2012, 2 pages.
Unknown, "Amazon Web Services Blog—The AWS Storage Gateway", Retrieved from <<http://aws.typepad.com/aws/2012/01/the-aws-storage-gateway-integrate-your-existing-on-premises-applications-with-aws-Cloud-storage.html>>, Retrieved on May 22, 2012, 5 pages.
Unknown, "Apple—iCloud", Retrieved from <<http://www.apple.com/icloud>>, Retrieved on May 22, 2012, 1 page.
Brewer, Eric A., "Towards Robust Distributed Systems", Abstract, Proceedings of the 19th Annual ACM Symposium on Principles of Distributed Computing, 2000, 2 pages.
Unknown, "Dropbox—Tour—Simplify your life", Retrieved from <<http://www.dropbox.com/tour>>, Retrieved on May 22, 2012, 1 page.
Unknown, "Atmos—Cloud Storage, Big Data—EMC", Retrieved from <<http://www.emc.com/storage/atmos/atmos.htm>>, Retrieved on May 22, 2012, 2 pages.
Gilbert et al., "Brewer's Conjecture and the Feasibility of Consistent, Available, Partition-Tolerant Web Services", Abstract, ACM SIGACT News, vol. 33, Issue 2, Jun. 2002, 2 pages.
Unknown, "s3fs", Retrieved from <<http://fedorahosted.org/s3fs/>>, Retrieved on May 22, 2012, 4 pages.
Unknown, "GLADINET—Cloud Attached File Server", Retrieved from <<http://www.gladinet.com/p/cloudgateway.html>>, Retrieved on May 22, 2012, 2 pages.
Unknown, "Google Docs", Retrieved from <<http://docs.google.com>>, Retrieved on May 22, 2012, 1 page.
Unknown, "Metalogix—SharePoint Storage Optimization with StoragePoint and BLOB Offloading", Retrieved from <<http://www.metalogix.com/Products/StoragePoint/StoragePoint-BLOB-Offloading.aspx>>, Retrieved on May 22, 2012, 1 page.
Unknown, "Introducing SkyDrive for the modern web, built using HTML5", Retrieved from <<http://windowsteamblog.com/windows_live/b/windowslive/archive/2011/06/20/introducing-skydrive-for-the-modern-web-built-using-html5.aspx>>, Retrieved on May 22, 2012, 38 pages.
Unknown, "StorSimple Appliance Features", Retrieved from <<http://www.storsimple.com/storsimple-appliance-features/>>, Retrieved on May 22, 2012, 2 pages.
Unknown, "Tech Blog—Starting Websphere in Cloud and saving the data in S3", Retrieved from <<http://techblog.aasisvinayak.com/starting-websphere-in-Cloud-and-saving-the-data-in-s3/>>, Retrieved on May 22, 2012, 8 pages.
Unknown, "VMware Workstation 6.5.0 Release Notes", <<http://www.vmware.com/support/ws65/doc/releasenotes_ws650.html, Retrieved on May 22, 2012, 5 pages.

* cited by examiner

TRANSPARENT VIRTUALIZATION OF CLOUD STORAGE

BACKGROUND

Existing remote file hosting services permit users to store data remotely and achieve a high degree of data access and data protection as well as essentially unlimited storage. However, the asynchronous nature of updates for files stored with these existing hosting services raises challenges for maintaining data consistency for frequently modified files especially when the remote storage is virtualized locally. For example, at least partly because of scaling issues associated with Brewer's Conjecture, wide area binary large object (blob) stores trade off consistency against availability such that reads of previously written data are not guaranteed to return the most recently written version of that data. Further, in some existing systems, both synchronous and asynchronous write operations are completed to the remote storage before the write operations are reported as successful. That is, the write operations block until the data has been successfully delivered to the remote storage. In the event of loss of all physical paths to the remote storage, the write operations may simply hang until the operation aborts.

Additionally, while the monetary costs of remote storage with the existing hosting services may be small, the cost per input/output (I/O) operation (e.g., bandwidth) may be high at least because the charges for I/O operations are not linear with the size of the transfer. For example, there is often a high base charge for the first byte transferred, and some existing hosting services do not support partial blob writes. Rather, these existing hosting services require rewrites of entire blobs even when changing just a single byte.

Further, the time required to complete each I/O operation with the existing hosting services may be significantly greater than traditional enterprise class storage devices. For example, access times over networks such as wide area networks are highly variable with heavy or fat tailed distribution.

As such, with some of the existing hosting systems, unplanned or unexpected data usage patterns may lead to high data storage costs and reduced responsiveness.

SUMMARY

One or more embodiments described herein reduce input/output (I/O) transfers between local storage and remote storage when surfacing a virtual disk image to a plurality of virtual machines (VMs) on at least one computing device. To facilitate reduction of I/O transfer costs, a binary large object (blob) of data stored in the remote storage is logically subdivided into a number of portions. A plurality of the portions is presented as the virtual disk image to the VMs or other applications executing on the computing device. A subset of the portions presented as the virtual disk image is stored in a local cache maintained by the computing device. In some embodiments, these cached portions represent cache "lines" or "grains", although the size need not be uniform. The computing device receives, from the applications, data operations relating to one or more of the portions. The received data operations are performed on the local cache for those portions stored in the subset in the local cache without communicating with the remote storage. Those portions not stored in the subset in the local cache are obtained from the remote storage, and the received data operations are performed thereon upon receipt by the computing device. In some embodiments, however, received write operations are returned as successful immediately and batched to the remote storage as lazy updates.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
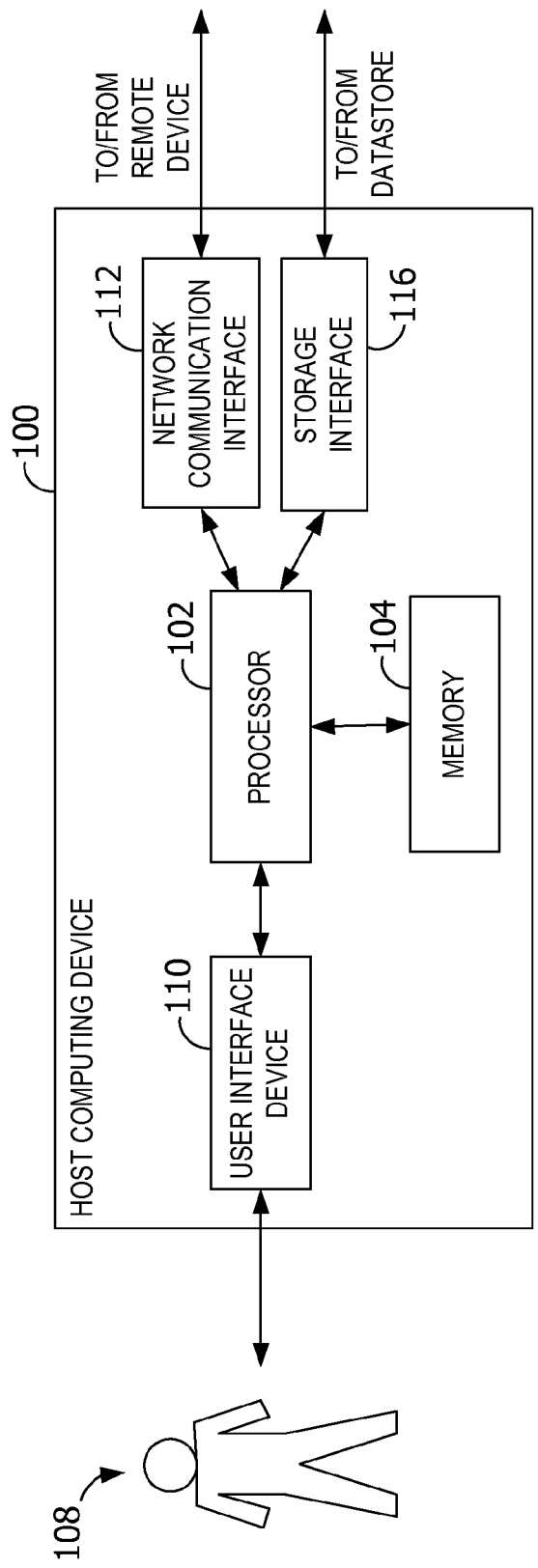
FIG. 1 is a block diagram of an exemplary host computing device.

Embodiments described herein provide a general architecture for presenting one or more applications 306 with at least one virtual disk image 402 stored on remote data stores while reducing input/output (I/O) transfer costs. In some embodiments, virtual disk images 402 are stored by a cloud service 314 and presented to a plurality of virtual machines (VMs) 235 executing on a host computing device 100. The general architecture enables applications 306, such as VMs 235, lacking enterprise class storage to benefit from enterprise class cloud storage services. That is, no architectural requirements or modifications are imposed on applications 306, or computing devices (e.g., host computing device 100 or computing device 303) executing applications 306, to implement any form of enterprise class storage. For example, aspects of the disclosure provide applications 306 not supporting a representational state transfer (RESTful) application programming interface (API) with virtual disk images 402 backed by remote storage accessed over a wide area network or other high latency, low bandwidth link. Worst-case latency may be seconds to minutes long over such links. As such, legacy software stacks may benefit transparently from enterprise quality availability, replication, and backup capabilities provided by cloud services, such as cloud service 314, while realizing significant storage cost savings.

Figure 3:
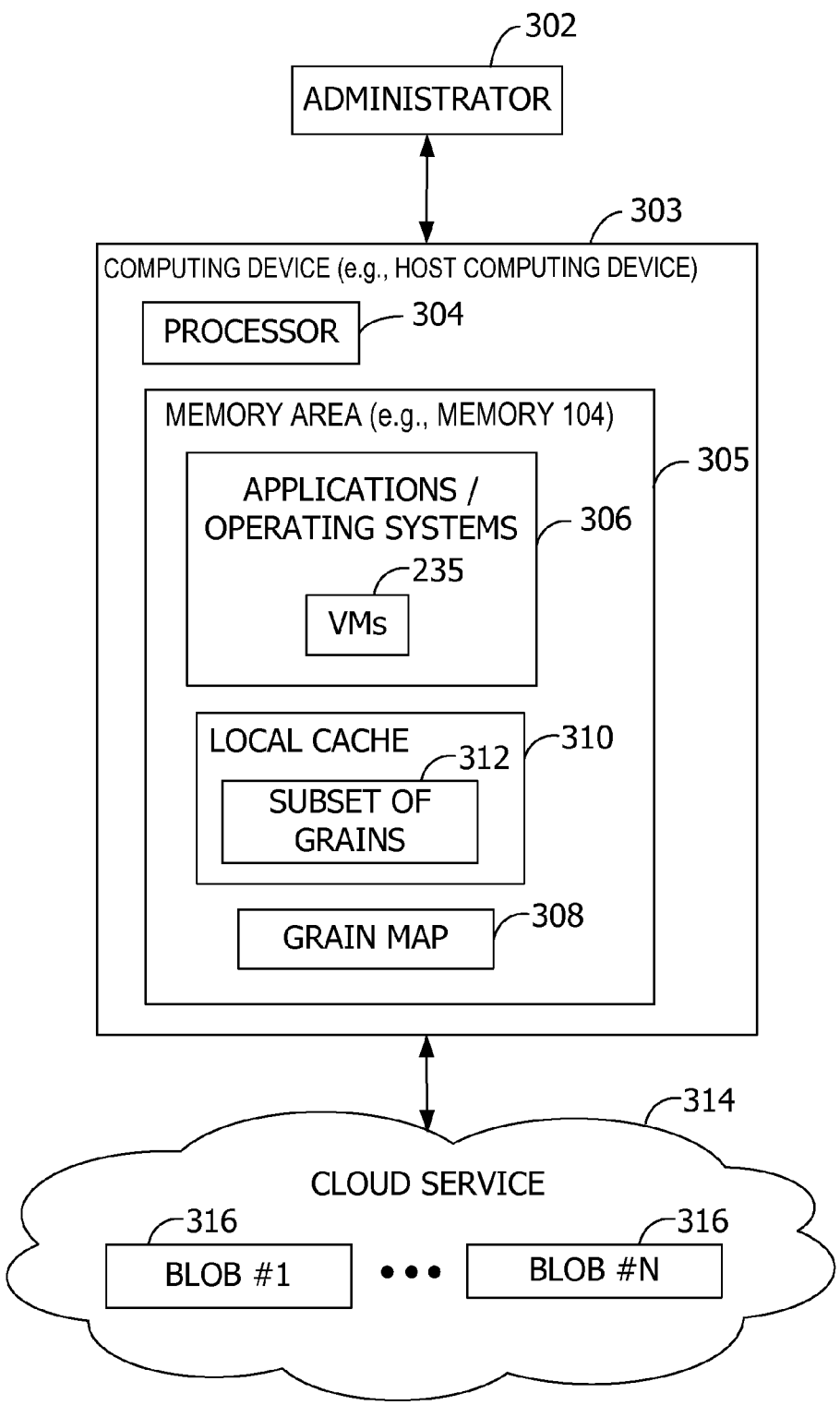
FIG. 3 is a block diagram of an exemplary computing device for presenting remote storage as a virtual disk image to applications executing on the computing device.

Aspects of the disclosure provide computing device 303 with intelligent and effective read caching and write consolidation by applications 306 to binary large object (blobs) 316 stored by cloud service 314, thus enhancing the responsiveness of access to low cost tiers of hierarchical storage. In particular, computing device 303 selectively stores portions of blobs 316 stored by cloud service 314. These portions or grains are stored in a local cache 310 which can be a file backed by persistent storage such as a local disk or SSD or in a memory area 305 as shown in FIG. 3, as the portions are accessed by applications 306. The size of the portions or grains is configurable and, in some embodiments, the size may be 64 kilobytes or 1 megabyte or otherwise generally larger than the sizes of blocks for physical disks.

Aspects of the disclosure further implement a log-structured file format (different from a file system) for virtual disk image 402. Read/write access to virtual disk image 402 may be provided to applications 306 via a file I/O interface. Writes from applications 306 to local cache 310 are consolidated with write success being returned to applications 306 after performance of the writes to local cache 310, but before performance of the writes (e.g., asynchronously) to cloud service 314. The file I/O interface acts as a blob file abstraction layer that includes modules providing caching, cleaning, grain alignment, I/O batching, and metadata management, among other functions. Below the blob abstraction layer, a blob manager 608 presents a blob object abstraction with a blob application programming interface (API) implementing create, read, update, and delete (CRUD) operations. Exemplary structures of the blob file abstraction layer and blob manager 608 are described with reference to FIG. 6 below.

The exemplary architecture described herein is operable with any cloud storage service. In some embodiments, cloud storage refers to any system of networked storage transparently replicated across multiple servers or other computing devices. Cloud storage may be owned and managed by an entity separate from the entity that owns and manages computing device. In some embodiments, external cloud storage refers to cloud storage owned and managed by an entity providing the storage as a fee based service.

Further, while described with reference to VMs 235 executing on host computing device 100 or computing device 303, aspects of the disclosure are applicable to any computing device executing any application and not limited to a VM environment.

FIG. 1 is a block diagram of exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more of datastores 316, which store virtual disk images 402, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
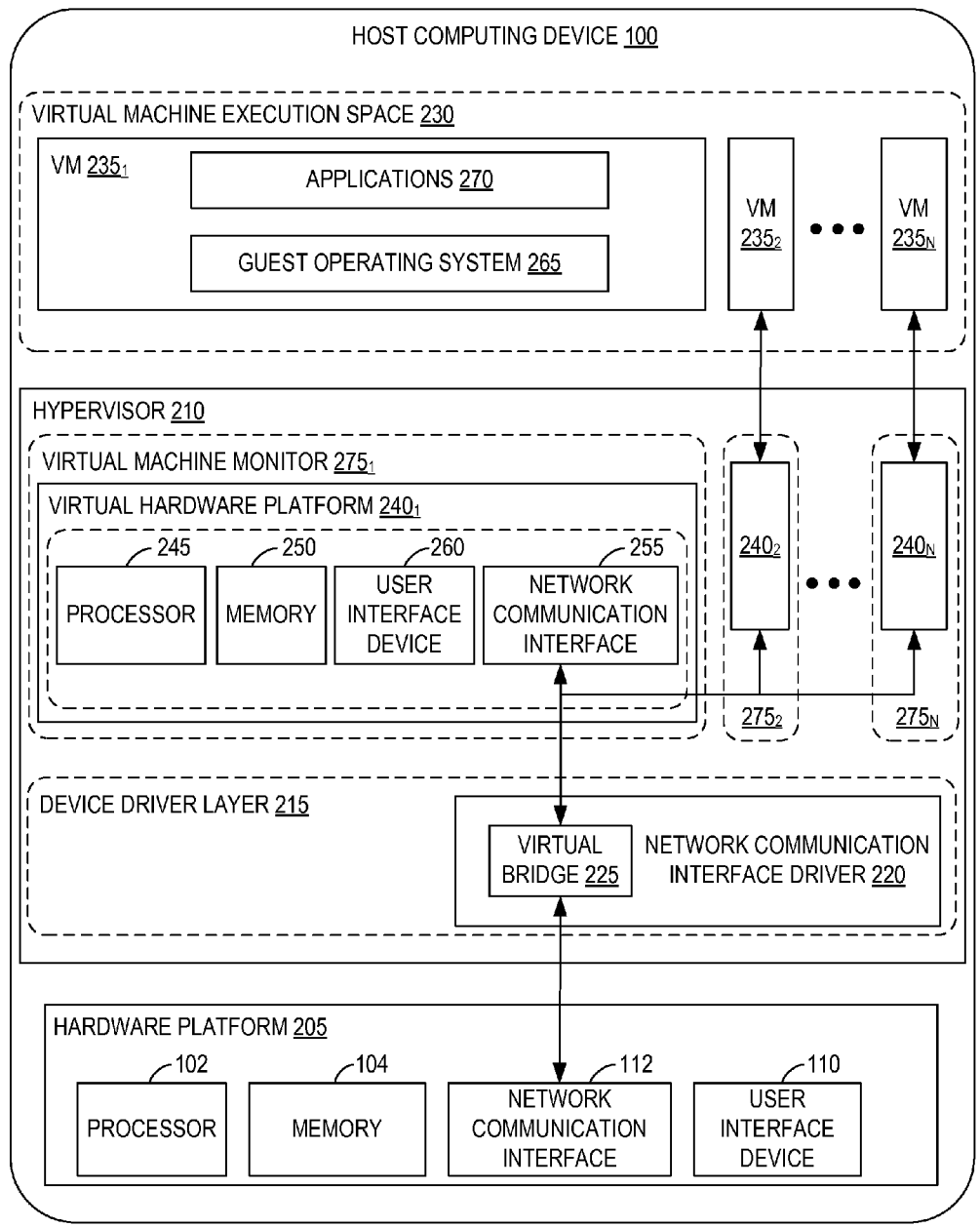
FIG. 2 is a block diagram of virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform 240₁ includes a virtual disk that is associated with or "mapped to" one or more virtual disk images 402 stored on a disk (e.g., a hard disk or solid state disk) of host computing device 100. Virtual disk image 402 represents a file system (e.g., a hierarchy of directories and files) used by first VM 235₁ in a single file or in a plurality of files, each of which includes a portion of the file system. In addition, or alternatively, virtual disk images 402 may be stored on one or more remote computing devices 100, such as in a storage area network (SAN) configuration. In such embodiments, any quantity of virtual disk images 402 may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs 235₁-235ₙ). Each virtual communication interface for each VM 235₁-235ₙ, such as network communication interface 255 for first VM 235₁, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs 235₁-235ₙ. This configuration enables an Ethernet packet that has a virtual MAC address as its destination address to properly reach VM 235 in host computing device 100 with a virtual communication interface that corresponds to such virtual MAC address.

Virtual hardware platform 240₁ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM 235, such as first VM 235₁. Virtual hardware platforms 240₁-240ₙ may be considered to be part of virtual machine monitors (VMM) 275₁-275ₙ that implement virtual system support to coordinate operations between hypervisor 210 and corresponding VMs 235₁-235ₙ. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms 240₁-240ₙ may also be considered to be separate from VMMs 275₁-275ₙ, and VMMs 275₁-275ₙ may be considered to be separate from hypervisor 210. One example of hypervisor 210 that may be used in an embodiment of the disclosure is included as a component in VMware's ESX brand software, which is commercially available from VMware, Inc.

FIG. 3 is a block diagram of exemplary computing device 303 for presenting remote storage as virtual disk image 402 to applications 306 executing on computing device 303. Administrator 302, or other user 108, may interact with computing device 303. Computing device 303 represents any device executing instructions (e.g., as application programs, operating system functionality, or both) to implement the operations and functionality associated with computing device 303. For example, computing device 303 executes instructions to implement transparent virtualized cloud storage for applications 306. Computing device 303 may include any computing device or processing unit. For example, computing device 303 may represent a group of processing units or other computing devices, such as in a cloud computing configuration.

Computing device 303 has at least one processor 304 and memory area 305. Processor 304 includes any quantity of processing units, and is programmed to execute computer-executable instructions for implementing aspects of the disclosure. The instructions may be performed by processor 304 or by multiple processors executing within computing device 303, or performed by a processor external to computing device 303. In some embodiments, processor 304 is programmed to execute instructions such as those illustrated in the figures to implement the operations illustrated and described with reference to FIG. 5.

Memory area 305 includes any quantity of computer-readable media associated with or accessible by computing device 303. Memory area 305, or portions thereof, may be internal to computing device 303, external to computing device 303, or both. In the example of FIG. 3, memory area 305 stores one or more of applications 306 and/or operating systems. Applications 306, when executed by processor 304, operate to perform functionality on computing device 303. Exemplary applications 306 include, for example, one or more VMs 235.

In some embodiments, memory area 305 represents persistent disk storage such as a solid-state disk or a hard disk drive.

Memory area 305 further represents or stores local cache 310 storing grains or portions associated with blobs 316 stored by cloud service 314. In some embodiments, the portions or grains correspond to a linear address space of virtual disk image 402, and virtual disk image 402 corresponds to one or more blobs 316. In some embodiments, local cache 310 stores only a proper subset 312 of a plurality of portions or grains associated with virtual disk images 402. For example, computing device 303 caches only those grains accessed by VMs 235, as needed, to reduce the amount of I/O transfers thereby reducing transfer costs. In some embodiments, local cache 310 may be stored on enterprise class storage, one or more solid-state disks (SSDs), or in other data storage (e.g., storage accessible via a serialized advanced technology attachment bus interface).

Memory area 305 also stores a grain map 308 for each of virtual disk images 402. Each grain map 308 correlates grains or portions of virtual disk image 402 to subparts of blobs 316 stored by cloud service 314. The subparts are referred to as bloblets in some embodiments, and collectively constitute the entirety of the virtual disk image 402. That is, the grains or portions are a logical subdivision and collectively represent the whole virtual disk image 402, while bloblets or subparts are a physical subdivision and collectively constitute virtual disk image 402.

Grain map 308 is consulted to identify the subparts (e.g., bloblets) affected by read/write operations on virtual disk image 402. In general, grain map 308 maps virtual disk image 402 accesses by applications 306 to subparts of blobs 316 stored in cloud service 314.

Cloud service 314 stores one or more blobs 316, such as blob #1 through blob #N. Cloud service 314 uses blob 316 as a unit of transfer and provides an API to computing device 303 that includes atomic Get and Put operations to transfer blobs 316 to and from cloud service 314. In some embodiments, cloud service 314 provides the ability to read and/or write at an offset within a particular blob 316, thus enabling atomic updates to blob 316 when computing device 303 does not have all or entire contents of blob 316 in local cache 310.

In some embodiments, computing device 303 communicates with cloud service 314 via at least one network. The network represents any means for communication between computing device 303 and cloud service 314. While some embodiments are described with reference to the network being a high latency, low bandwidth link, aspects of the disclosure are operable with any network type or configuration.

Figure 4:
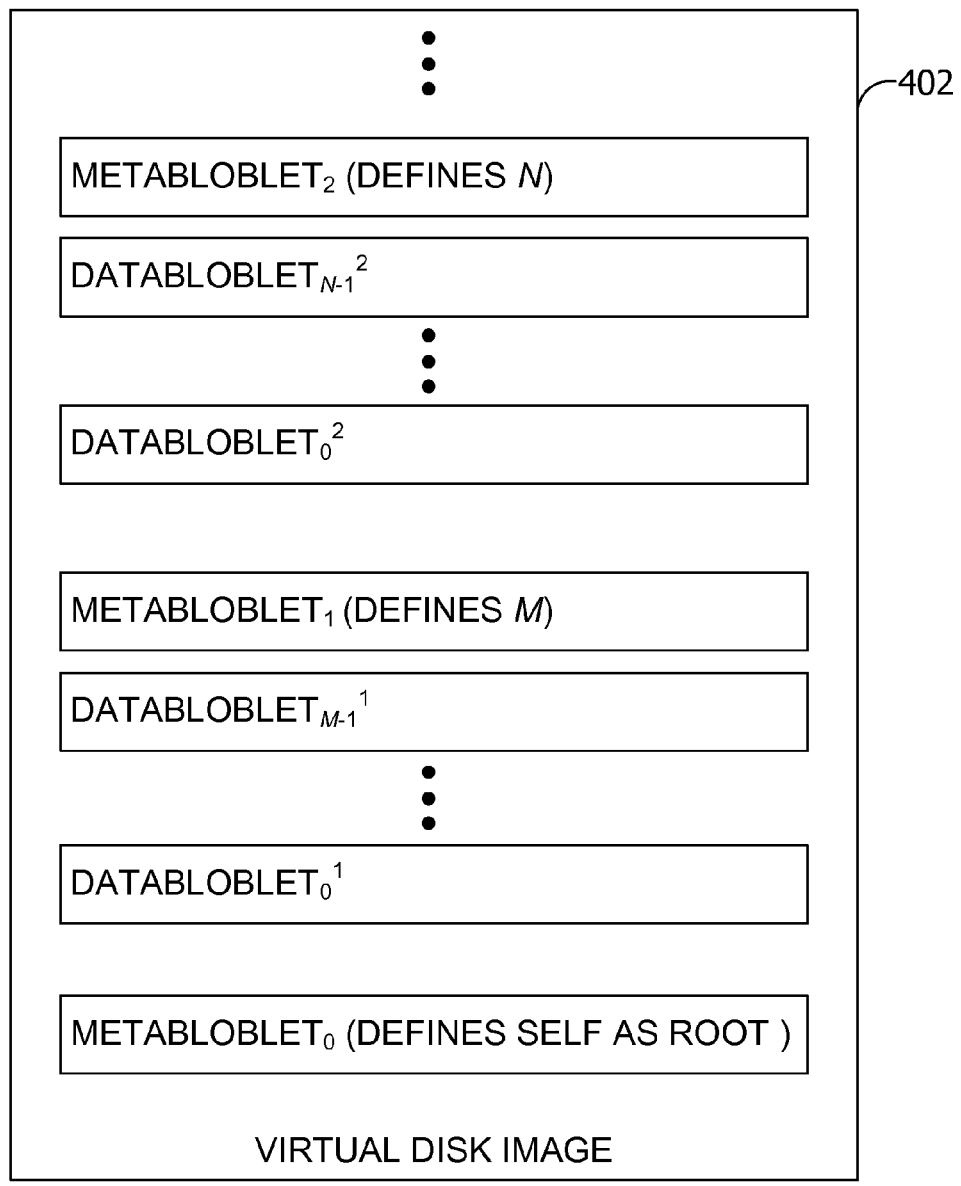
FIG. 4 is a block diagram of an exemplary virtual disk image composed of one or more binary large objects (blobs) stored by a cloud service.

FIG. 4 is a block diagram of an exemplary virtual disk image 402 composed of one or more subparts (e.g., bloblets) of blobs 316 stored by cloud service 314. In some embodiments, the address space of virtual disk image 402 is partitioned into a series of equal-sized grains that are mapped to the subparts of blobs 316 via grain map 308. Grain map 308 for virtual disk image 402 enables location of the current version of grains in cloud service 314 by identifying, for example, a blob identifier of the corresponding blob 316, offset of the grain in the corresponding blob 316, and grain length or size.

In some embodiments, sparseness is provided by mapping grains having only zeroes to a null blob 316. Such grains are not stored by cloud service 314. In other embodiments, de-duplication is provided by mapping grains having a multiplicity of common patterns (e.g., all ones, all zeroes, patterns corresponding to disk formatting, etc.) to a small set of de-duplication blob identifiers that are only stored a single time in cloud service 314. This represents, for example, zero suppression. For example, on receiving a plurality of read requests directed to reserved mappings in grain map 308, computing device 303 synthesizes, without communicating with cloud service 314, at least one common pattern for the grains not stored in local cache 310. In another example, on receiving a plurality of write requests directed to at least one of the common patterns, computing device 303 updates grain map 308 with a reserved mapping without sending any data to cloud service 314. In still another example, computing device 303 detects a frequently occurring pattern for the grains in received data operations and maps the detected patterns to the same grain in the same subpart of blob 316.

Writes of virtual disk image 402 to cloud service 314 include writes of groups of one or more bloblets with each group followed by a single metadata blob containing grain map 308. In this manner, virtual disk image 402 is implemented using a log structured file format (instead of a file system) to perform a plurality of data operations sequentially.

In the example of FIG. 4, the exemplary format of virtual disk image 402 is a metadata blob followed by a sequence of databloblets with each sequence of databloblets followed by a metadata update bloblet. In some embodiments the bloblets share a common header that includes blob format version information, grain size (invariant over the life of blob 316 in some embodiments), and a checksum (e.g., CRC32). In some embodiments, data bloblets may also contain a set of blob range descriptors that map grains to offsets in the virtual disk image 402 linear address space and that also include checksums for individual grains. In further embodiments, the initial metadata bloblet is distinguished and contains invariant information such as the platform and disk version as well as the disk name and instance information. In such further embodiments, subsequent metadata bloblets following each group of databloblets are referred to as metadata update bloblets and each includes the identifier of the initial metadata bloblet and a snapshot of grain map 308 as it existed when the metadata bloblet was written. In still other embodiments, some metadata update bloblets are distinguished in that they are persisted as the basis for snapshots rather than being garbage collected, and in such embodiments subsequent metadata update bloblets also include the identifier of the most recent persistent metadata update bloblet to facilitate snapshotting, rollback and other useful operations.

The example of FIG. 4 illustrates an exemplary virtual disk image 402 having two sequences of databloblets (e.g., $\text{DATABLOBLET}^1$ sequence and $\text{DATABLOBLET}^2$ sequence) each followed by a metadata update bloblet (e.g., $\text{METABLOBLET}_1$ and $\text{METABLOBLET}_2$). The first metadata update bloblet may be persistent (e.g., a native blob 316 snapshot) or this metadata update bloblet may be awaiting deletion by the cleaner. The cleaner removes no longer utilized bloblets and optionally consolidates bloblets with low utilization. Grain map 308 stored with each metadata update bloblet provides sufficient information such that upon an open of an existing bloblet the virtual disk image data written prior to the metadata update bloblet may be read. When a read of one or more grains is dispatched to cloud service 314, grains may reside in different databloblets and may not include all grains in any one databloblet. As such, in some embodiments, checksums for each grain are stored in the blob range descriptors as described above, rather than checksums for the entire databloblet.

In some embodiments, virtual disk image 402 is identified to VMs 235 via a datastore type. An exemplary datastore type includes a tuple of a local datastore that holds local cache 310, a uniform resource locator (URL) of cloud service 314, and provider-specific access credentials (e.g., username and password).

Figure 5:
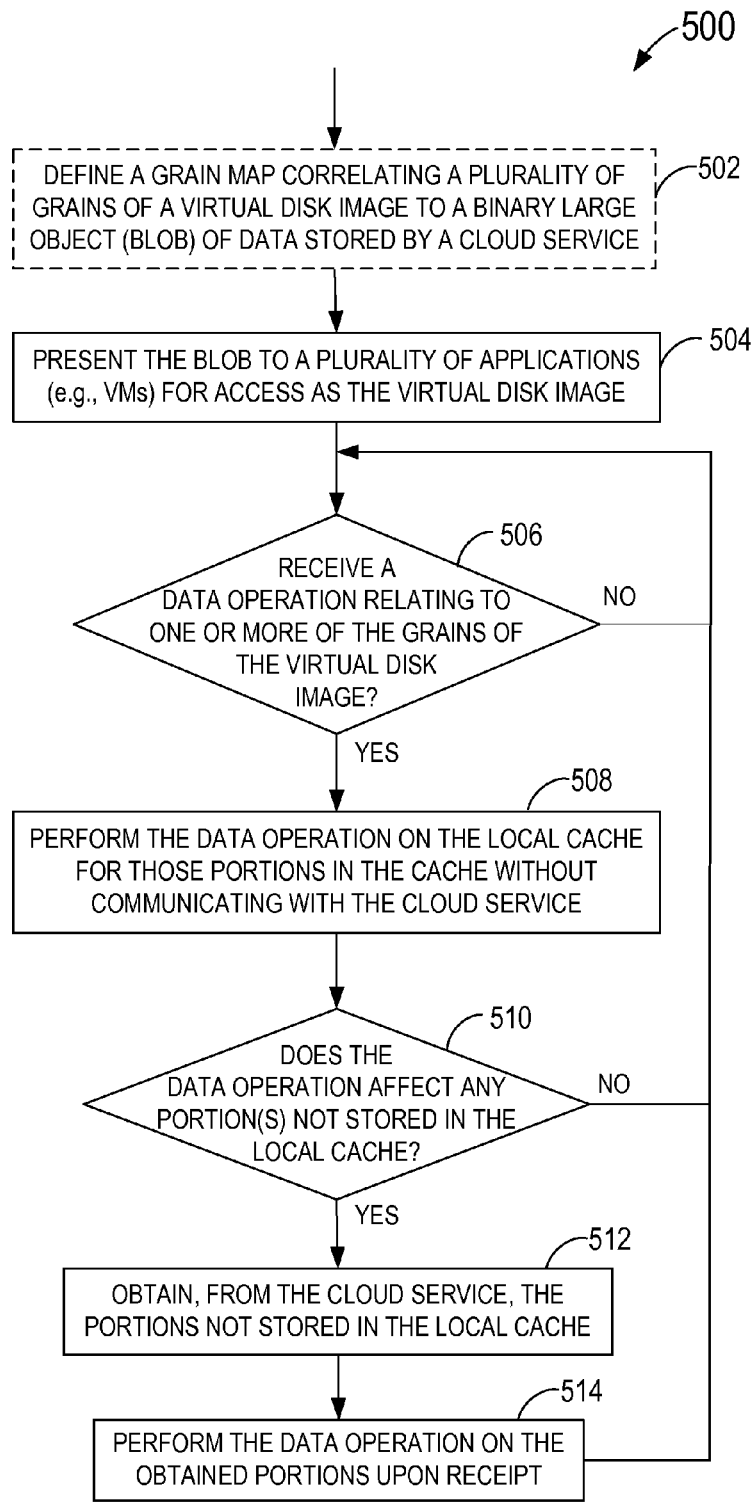
FIG. 5 is a flowchart of an exemplary method performed by a computing device, such as the host computing device shown in FIG. 1, for minimizing data transfer operations with remote storage presented as a virtual disk image.

FIG. 5 is a flowchart of an exemplary method performed by a computing device such as computing device 303 or host computing device 100, for minimizing data transfer operations with remote storage presented as virtual disk image 402. While method 500 is described with reference to execution by computing device 303 (shown in FIG. 3), it is contemplated that method 500 may be performed by any entity capable of processing instructions. For example, the operations may be performed by hypervisor 210.

As described above (e.g., see FIG. 4), virtual disk image 402 is composed of one or more subparts (e.g., bloblets) of one or more blobs 316. In some embodiments, computing device 303 subdivides blobs 316 composing virtual disk image 402 into portions or grains for access by applications 306. Alternatively, another entity may subdivide blob 316. At 502, computing device 303 optionally defines grain map 308 correlating grains of virtual disk image 402 to blobs 316 representing virtual disk image 402. Operation 502 is optional because grain map 308 may already be defined (e.g., by cloud service 314 or another entity).

At 504, computing device 303 presents blobs 316 as virtual disk image 402 to applications 306 executing on computing device 303. Computing device 303 caches subset 312 of portions of blobs 316 representing virtual disk image 402 in local cache 310 maintained by computing device 303. For example, computing device 303 caches one or more grains of virtual disk image 402. In some embodiments, computing device 303 stores only subset 312 of grains (e.g., not all of the grains) of virtual disk image 402 in local cache 310. In such embodiments, tracking which grains are accessed by applications 306 over time (e.g., receive a plurality of the data operations) enables aspects of the disclosure to model how much data, and which grains, to cache. Computing device 303 may also track a quantity of accessed grains to automatically increase or reduce the amount of cached data. Further, computing device 303 may cache, for a predefined duration, only those grains of virtual disk image 402 affected by, or involved with, the plurality of data operations received over time.

If computing device 303 receives, from at least one of applications 306, a data operation (e.g., read request, write request, etc.) relating to one or more grains of virtual disk image 402 at 506 (e.g., stored in subset 312 in local cache 310), computing device 303 performs the received data operation on local cache 310 for those grains at 508. For example, computing device 303 identifies one or more grains stored in local cache 310, and performs the received data operation on the identified grains. Operation 508 is performed without communicating with cloud service 314, and without blocking application (in some embodiments).

If the received data operation involves, or affects, at 510 portions (e.g., grains) not stored in local cache 310, computing device 303 obtains, from cloud service 314 at 512, those portions not stored in local cache 310. For example, computing device 303 identifies one or more grains involved in the received data operation that are not stored in local cache 310, and obtains those identified grains from cloud service 314. Computing device 303 performs the received data operation at 514 on the portions (e.g., grains) obtained from cloud service 314, upon receipt by computing device 303.

In some embodiments, computing device 303 confirms completion of a write request to application before completing or committing the write request (e.g., to local cache 310 or to cloud service 314) to reduce latency perceived by application. Reduced latency provides applications 306 with the appearance of using local storage for the read/write operations.

Computing device 303 may further periodically flush local cache 310 to cloud service 314 (or other blob store). The cache flush may be a partial flush. The cache flush respects write ordering and is crash consistent. That is, the image of virtual disk image 402 in cloud service 314 after the flush corresponds exactly to virtual disk image 402 that would have existed on an ordinary block device at some point in time between the flush and the immediately preceding flush. If VM 235 or other application has multiple virtual disk images 402, a consistency group may be formed to coordinate cache flushes so that a crash consistent version of VM 235 may be restored. Crash consistent flushes preserve write ordering and coalesce writes. For example, two writes close enough together in time may arrive simultaneously at cloud service 314.

One or more of the operations illustrated in FIG. 5 may be performed by computer-executable instructions stored on one or more computer storage media (e.g., memory area 305). The instructions, when executed by processor 304, cause the processor 304 to perform the operations.

Figure 6:
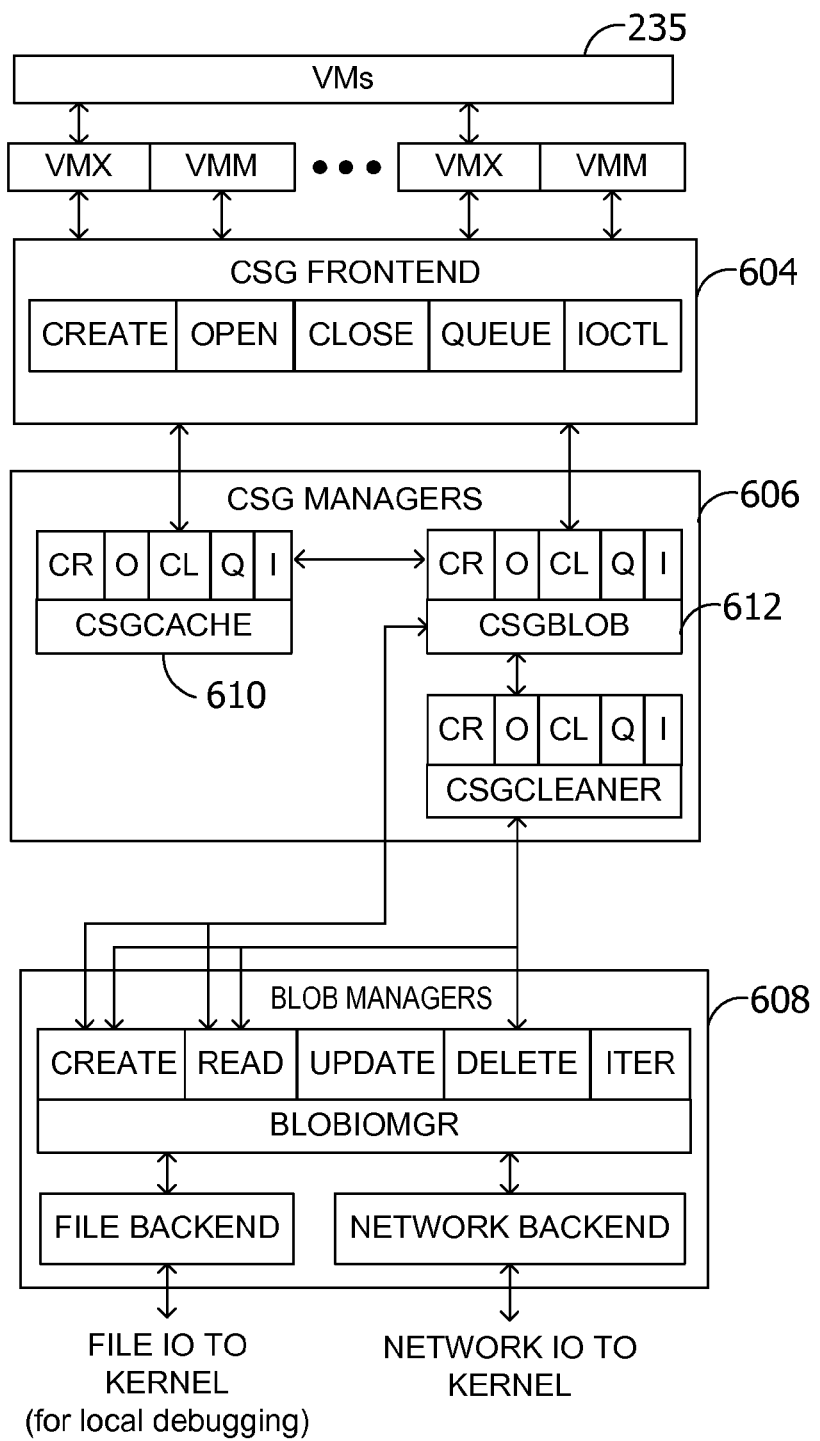
FIG. 6 is a block diagram of an exemplary I/O interface for performing data operations on remote storage presented as a virtual disk image.

FIG. 6 is a block diagram of an exemplary I/O interface for performing data operations on remote storage presented as virtual disk image 402. The I/O interface includes several exemplary components, but is not limited to the illustrated components. Other configurations, with more or less components, are contemplated. Further, for clarity, the arrows show dataflow between the components without distinction between control flow (create/open/ioctl/close) and dataflow (read/write).

In general, the exemplary I/O interface executes in the context of a user space library or virtualization application such as the VMware VMX process and includes a Cloud Storage Gateway (CSG) frontend 604 and several CSG manager 606 modules plus blob manager 608 module with vendor-specific file and network backends. The CSG frontend 604 implements functions such as Create (e.g., initialize cache, put metabloblet to cloud service 314), Open (e.g., initialize cache, read metabloblet from cloud service 314), Close (e.g., flush cache, put metabloblet to cloud service 314, upload local virtual disk image files), Queue (e.g., read/write to/from local cache 310, with cache misses proxied to cloud service 314 via csgBlob 612), and IOCTL (e.g., direct access to databloblets and metabloblets).

The CSG manager 606 modules include a cache module, a blob abstraction layer, a file I/O module, and a blob cleaner garbage collection module. In some embodiments, the cache layer expands I/O operations so that each scatter gather element is grain aligned and is a multiple of the grain size. The blob cleaner module executes in the background to reclaim obsolete grains and blobs 316, such as by using usage count field in grain map 308 to determine bloblets that are candidates for cleaning. Partial flushes are supported and the partial flushes maintain write ordering. Evicted grains are unmapped to preserve, maintain, or maximize disk space. In some embodiments, the eviction policy is a modified least recently used (LRU) algorithm that favors non-dirty (e.g., unchanged or unmodified) grains.

Blob manager 608 presents a vendor neutral blob interface with a Create, Read, Update, Delete (CRUD) API and hides specifics of RESTful access to individual cloud services 314 or other blob store implementations by accepting plugin modules from the vendors. In some embodiments, the provider-specific backend modules are implemented as PYTHON brand web server modules.

Encryption is optional and may be provided either by csgBlob 612 module in the blob abstraction layer (e.g., below the cache) or at the local cache 310, in some embodiments. Implementing encryption in the blob abstraction layer minimizes or reduces the amount of data for decryption and removes the time for encryption from the primary data path. In such embodiments, only data sent to cloud service 314 is encrypted. For example, computing device 303 performs data operations on local cache 310 without encryption. In this manner, if the csgBlob 612 module is efficient at caching data, the amount of data for encryption and decryption is reduced. By reducing the amount of data for encryption and decryption, the overall performance is improved.

In operation, at create time, the csgCache module 610 is initialized by the CSG frontend 604 module and an initial metadata bloblet is written to cloud service 314 by the csgBlob 612 module. The csgBlob 612 module implements the Blob Abstraction Layer. Upon an open command, the most recent metadata bloblet is retrieved from cloud service 314 and local cache 310 is initialized based on the grain size of the existing blob 316. Read I/O operations are satisfied by local cache 310 when possible and, if not, the read I/O operations are forwarded to cloud service 314 on behalf of the requesting VM 235. Requesting VM 235 blocks until the read I/O operations are completed. For write I/O operations, the cache module in some embodiments imposes grain size alignment so that a non-grain-aligned write operation that misses in local cache 310 spawns read operations to cloud service 314 for the remainder of the data in the affected grain. The spawned read does not block the write I/O operation. Instead, cached data is flushed periodically with writes committed from local cache 310 to cloud service 314. Local cache 310 is also flushed when a close operation is performed.

Exemplary I/O flows performed with the exemplary I/O interface illustrated in FIG. 6 are next described. As an example, the I/O flow on a read/write operation may occur as follows:

1. VM 235 issues a read/write operation that is passed through the VMX and CSG frontend 604.
2. The CSG frontend 604 receives the read/write operation and passes it to a grain size alignment module (e.g., csgCache module 610).
3. Both read and write operations may generate cache read misses. For example, any sub-grain size write operation spawns a grain size read operation that may miss in local cache 310.
4. The grain size-aligned read or write operation is passed to local cache 310 where a hit or miss may occur.
5. Write operations are immediately returned by local cache 310 as successful, whether or not the write operations are hits or misses, modulo the delay for the spawned grain read in operation 3. A high degree of responsiveness is achieved in this manner. In some embodiments, a small amount of tagged sub-grain size cache space is available for storing small writes while waiting for the read of the surrounding portions of the grain.
6. Read operation misses block VM 235.
7. When each read miss is fulfilled, success is returned to VM 235. In this example of a read operation, data may be read from cloud service 314 due to grain alignment, but no data is written to cloud service 314.

In another example, the I/O flow on a cache read miss may occur as follows:

1. A read operation miss in local cache 310 generates a set of blob 316 grain requests to the csgBlob 612 module.
2. The csgBlob 612 module uses grain map 308 to determine, for each grain, the blob identifier of blob 316 containing that grain, as well as a start offset and length of that grain. A set of BlobIOVectors is constructed that contain I/O vectors pointing to memory allocated to perform the read operation. The length is used to consolidate read operations to adjacent grains if possible.
3. The constructed set of BlobIOVectors is passed to BlobIOMgr via the Read interface of the exported CRUD interface.
4. BlobIOMgr passes the read request to the provider-specific network backend.
5. The provider-specific network backend assembles a RESTful API Get operation (e.g., a hypertext transfer protocol request) and dispatches the Get operation via a network stack of the kernel.
6. When the requested data is received by the provider-specific network backend, the received data is passed up the I/O interface via the BlobIOMgr to the csgBlob 612 module and ultimately returned to the csgCache module 610.

In another example, the I/O flow on a cache flush may occur as follows:

1. Periodically, local cache 310 is flushed. The flush may occur because dirty data exceeds a threshold, a predetermined interval of time has passed, or for other reasons. The cache flush may also be partial so long as the flush preserves write ordering.

2. A set of grains for writing to the same blob 316 is passed to the csgBlob 612 module. The csgBlob 612 module constructs a BlobIOVector that maps each grain into the to-be-written blob 316.
3. The constructed BlobIOVector is passed to the BlobIOMgr via the Create interface of the exported CRUD interface. The Create interface may generate multiple requests to the provider-specific backend modules due to provider-specific size limitations such as maximum blob 316 size.
4. The provider-specific backend module assembles a RESTful API Put operation (e.g., a hypertext transfer protocol request) and dispatches the Put operation via a network stack of the kernel. When the Put operation completes, the BlobIOMgr module returns success or failure to the csgBlob 612 module.
5. If the request fails, error handling is attempted (e.g., retry, store locally and suspend the VM 235, crash, etc.).
6. If the request succeeds, the csgBlob 612 module constructs a metadata blob containing an updated grain map 308 that provides an index to the location of every grain in virtual disk image 402.
7. The constructed metadata blob is passed to the BlobIOMgr and ultimately to the provider-specific backend module that generates another Put operation to write to cloud service 314.
8. On success of the metadata blob write, the previous metadata blob is unneeded (unless that blob is marked persistent), so the csgBlob 612 module queues the previous metadata blob to the cleaner module for removal.
9. In some embodiments, the csgBlob 612 module signals the cleaner module to reclaim unused data blobs 316 and/or to compact lightly/sparsely used data blobs 316 (e.g., data blobs 316 whose grains are referenced by either the most recent metadata blob or a previous persistent metadata blob). The cleaner uses the CRUD Delete API.

In another example, the I/O flow on a create, open, or close operation may occur as follows:

1. VM 235 issues a create/open/close operation that is passed through the VMX and CSG frontend 604.
2. The CSG frontend 604 module opens and closes local cache 310 and the blob module. For both the create and open operations, local cache 310 is instantiated via an IOCTL operation that specifies the grain size. The csgBlob 612 module opens the cleaner module.
3. For create operations, the csgBlob 612 module outputs a metadata blob as specified by the create operation (e.g., disk size) and includes a grain size.
4. For open operations, the csgBlob 612 module reads the most recent metadata blob, determines the grain size for blob 316, and returns this to the CSG frontend 604 module.
5. For close operations, a flush is triggered that includes the write of a metadata blob, after which the cleaner module may run. When the csgBlob 612 module is closed, a second metadata blob is written so that the saved grain map 308 is up-to-date.

Additional Examples

The following scenarios are merely exemplary and not intended to be limiting in any way. In scenarios in which a large amount of data is read from cloud service 314 and VMs 235 process the read data sequentially, aspects of the disclosure may unblock those VMs 235 before all the data of interest has been obtained from cloud service 314. For example, VMs 235 may begin processing any received data while additional data is still being obtained. Such an early unblock reduces the storage latency time perceived by VMs 235. The received data may be selectively presented to VMs 235 with any missing pages unmapped. Partial reads may be evaluated for early return (and unblocking) based on, for example, the percentage of data available for immediate return, the relative distribution of unavailable data, and the estimated duration until full completion of the read request (e.g., how many separate outstanding blob 316 reads are required).

In another example, fast cloning and snapshotting of virtual disk image data may be supported with persistent metadata bloblets. Each metadata bloblet describes a "snapshot" of virtual disk image 402. The snapshot represents a complete and valid version of virtual disk image 402 at a point in time. Version information associated with the snapshots may be surfaced to support fast cloning and/or comparison.

Exemplary Operating Environment

The operations described herein may be performed by one or more computers or computing devices. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for reducing input/output costs when surfacing remote storage as local storage by host managing a plurality of VMs 235.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A host computing device comprising:
a local memory including a memory area caching a subset of a plurality of grains corresponding to a binary large object (blob) representing a virtual disk image for a virtual computing instance running in the host computing device, the grains including a first grain, the blob having a plurality of subparts stored by a cloud service connected to the host computing device via a network; and
a processor programmed to:
present the blob to the virtual computing instance for access by the virtual computing instance as the virtual disk image for the virtual computing instance;
define a grain map that is stored in the local memory and correlates the plurality of grains of the virtual disk image to the plurality of subparts of the blob;
receive, from the virtual computing instance, a data operation directed to the first grain;
determine whether or not the first grain is cached in the memory area;
if the first grain is cached in the memory area, perform the received data operation on the memory area for said first grain without communicating via the network;
if the first grain is not cached in the memory area, identify via the defined grain map that is stored in the local memory a subpart of the blob corresponding to the first grain, obtain the first grain from the subpart of the blob via the network, and perform the received data operation on the first grain obtained from the subpart of the blob via the network; and
confirm completion of the data operation to the virtual computing instance,
wherein the data operation comprises a data read operation or a data write operation, and
wherein the processor is further programmed to:
(i) confirm completion of the data write operation to said virtual computing instance before completing the received data write operation on the first grain to reduce latency perceived by said virtual computing instance; and
(ii) perform the data read operation and evaluate partial reads for early return to said virtual computing instance.

2. The host computing device of claim 1,
wherein the processor is programmed to receive a plurality of data operations, and
wherein the processor is further programmed to implement the virtual disk image in a log structured format to perform the received plurality of data operations sequentially.

3. The host computing device of claim 1, wherein the plurality of grains correspond to an address space of the virtual disk image.

4. The host computing device of claim 1, wherein, on receiving a plurality of read requests directed to reserved mappings in the grain map, the processor is programmed to synthesize, without communicating with the cloud service, at least one common pattern for said one or more of the plurality of grains not cached in the memory area.

5. The host computing device of claim 1, wherein, on receiving a plurality of data write operations directed to at least one common pattern of one or more of the plurality of grains, the processor is further programmed to update the grain map with a reserved mapping without sending any data to the cloud service.

6. The host computing device of claim 1, wherein the processor is further programmed to:
detect a frequently occurring pattern for one or more of the plurality of grains in the received data operation; and
map the detected pattern to the same grain in the same subpart of the blob.

7. A method comprising:
subdividing, by a host computing device, a binary large object (blob) of data stored by a cloud service into a plurality of subparts, the blob being presented as a virtual disk image to a virtual computing instance executing on the host computing device for access by the virtual computing instance as the virtual disk image for the virtual computing instance and storing the virtual disk image in the subparts in units of grains;
defining a grain map that is stored in a local memory of the host computing device and correlates the grains of the virtual disk image to the subparts of the blob;
receiving, from the virtual computing instance, a data operation directed to a first grain of the virtual disk image;
determining whether or not the first grain is stored in a local cache of the host computing device;
if the first grain is stored in the local cache, performing the received data operation on the local cache for said first grain without communicating with the cloud service;
if the first grain is not stored in the local cache, identifying via the defined grain map a subpart of the blob corresponding to the first grain, obtaining the first grain from the subpart of the blob, and performing the received data operation on the first grain obtained from the subpart of the blob; and
confirming completion of the data operation to the virtual computing instance,
wherein the data operation comprises a data read operation or a data write operation, and the method further comprises:
(i) confirming completion of the data write operation to the virtual computing instance before completing the received data write operation on the first grain to reduce latency perceived by the virtual computing instance; and
(ii) performing the data read operation and evaluating partial reads for early return to the virtual computing instance.

8. The method of claim 7, further comprising:
receiving a plurality of data operations over time; and
storing, by the host computing device in the local cache for a predefined duration, only the grains corresponding to the subparts of the blob affected by the received plurality of data operations.

9. The method of claim 7, wherein performing the received data operation on the local cache comprises performing the received data operation without encryption, and further comprising encrypting only data sent to the cloud service.

10. The method of claim 7, wherein the local cache of the host computing device is backed by the local memory of the host computing device.

11. One or more computer-readable storage media including computer-executable instructions that, when executed, cause at least one processor of a host computing device to present a virtual disk image from a cloud service to a virtual computing instance running in the host computing device for access by the virtual computing instance as the virtual disk image for the virtual computing instance, while minimizing transfer costs, by performing a method comprising:
  accessing a binary large object (blob) of data stored by the cloud service, the blob being subdivided by the host computing device into a plurality of subparts, the blob being presented as a virtual disk image to the virtual computing instance and storing the virtual disk image in the subparts in units of grains,
  defining a grain map that is stored in a local memory of the host computing device and correlates the grains of the virtual disk image to the subparts of the blob;
  receiving, from the virtual computing instance, a data operation directed to a first grain of the virtual disk image;
  determining whether or not the first grain is stored in a local cache of the host computing device;
  if the first grain is stored in the local cache, performing the received data operation on the local cache for said first grain without communicating with the cloud service;
  if the first grain is not stored in the local cache, for both a read data operation that is received and a write data operation that is received, identifying via the defined grain map a subpart of the blob corresponding to the first grain, obtaining the first grain from the subpart of the blob, and performing the received data operation on the first grain obtained from the subpart of the blob; and
  confirming completion of the data operation to the virtual computing instance,
  wherein the data operation comprises a data read operation or a data write operation, and the method further comprises:
    (i) confirming completion of the data write operation to the virtual computing instance before completing the received data write operation on the first grain to reduce latency perceived by the virtual computing instance; and
    (ii) performing the data read operation and evaluating partial reads for early return to the virtual computing instance.

12. The computer storage media of claim 11, wherein the computer-executable instructions further cause the processor to periodically flush the local cache to the cloud service.

13. The computer storage media of claim 11, wherein the computer-executable instructions further cause the processor to map virtual disk image access by the virtual computing instance to blob access by the host computing device.

14. The computer storage media of claim 11, wherein the computer-executable instructions cause the processor to minimize I/O transfers by storing in the local cache only the grains accessed by the virtual computing instance.

15. The computer storage media of claim 11, wherein the local cache of the host computing device is backed by the local memory of the host computing device.

* * * * *